United States Patent
Iezzi et al.

(10) Patent No.: US 9,006,307 B2
(45) Date of Patent: Apr. 14, 2015

(54) DIRECT TO-METAL AND EXTERIOR DURABLE NON-SKID COATING

(75) Inventors: Erick B. Iezzi, Arlington, VA (US); James R. Martin, Alexandria, VA (US); Paul Slebodnick, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/887,546

(22) Filed: Sep. 22, 2010

(65) Prior Publication Data

US 2012/0071582 A1 Mar. 22, 2012

(51) Int. Cl.
| | |
|---|---|
| *C09K 3/14* | (2006.01) |
| *C09D 163/00* | (2006.01) |
| *C09D 183/08* | (2006.01) |
| *C08K 5/544* | (2006.01) |
| *C08G 77/26* | (2006.01) |

(52) U.S. Cl.
CPC .............. *C09D 163/00* (2013.01); *C09K 3/149* (2013.01); *C09D 183/08* (2013.01); *C08K 5/544* (2013.01); *C08G 77/26* (2013.01)

(58) Field of Classification Search
USPC ............. 525/476, 100, 477; 524/588; 106/36; 523/150
See application file for complete search history.

(56) References Cited

U.S. PATENT DOCUMENTS

| | | | |
|---|---|---|---|
| 4,008,294 A | 2/1977 | Marans et al. | 525/168 |
| 4,988,778 A * | 1/1991 | Chang et al. | 525/476 |
| 6,217,252 B1 * | 4/2001 | Tolliver et al. | 404/77 |
| 6,268,440 B1 * | 7/2001 | Kudo et al. | 525/477 |
| 2005/0148752 A1 * | 7/2005 | Klaassens et al. | 528/38 |
| 2009/0072199 A1 | 3/2009 | Lewarchik et al. | 252/396 |
| 2009/0234071 A1 * | 9/2009 | Martz et al. | 525/100 |
| 2010/0028690 A1 * | 2/2010 | Parks et al. | 428/418 |
| 2011/0224327 A1 * | 9/2011 | Kardash et al. | 523/150 |

OTHER PUBLICATIONS

3M Zeeospheres Product Information Sheet, http://www.emgitalia.com/pdf/3M%20ZEOSFERE.pdf, p. 4.*
EGM 400 Structural Information from SciFinder.*
3M Zeeospheres Product Information Sheet, http://www.emgitalia.com/pdf/3M%20ZEOSFERE.pdf, p. 4, Aug. 2012.*
EGM 400 Structural Information from Scifinder, Nov. 1984.*
International Search Report and Written Opinion for Application No. PCT/US10/49740, dated Nov. 3, 2010.

* cited by examiner

*Primary Examiner* — Nicole M Buie-Hatcher
*Assistant Examiner* — Chelsea M Lowe
(74) *Attorney, Agent, or Firm* — US Naval Research Laboratory; Joseph T. Grunkemeyer

(57) ABSTRACT

A non-skid coating described herein attempts to overcome the deficiencies of the conventional coatings with improved external durability and color retention, a reduced level of VOCs, and direct-to-metal (DTM) adhesion using organosiloxane chemistry. The non-skid coating has a first component having an amino-functional siloxane resin; a second component having a non-aromatic epoxy resin; a spherical filler for lowering viscosity; a pigment; a coarse aggregate; and a thixotropic agent. The amino-functional siloxane resin can be an amino-functional methyl phenyl polysiloxane, diphenyl polysiloxane or silsesquioxane-based resin. The non-aromatic epoxy resin can be cycloaliphatic or aliphatic. The first component is about 5% to 20% weight of the coating, and the second component is about 80% to 95% weight of the coating.

14 Claims, No Drawings

DIRECT TO-METAL AND EXTERIOR DURABLE NON-SKID COATING

TECHNICAL FIELD

The present application relates generally to a non-skid coating with improved exterior durability and direct-to-metal adhesion.

BACKGROUND

The flight decks of U.S. Navy ships are a highly vital component for conducting war-time flight operations, training exercises, and the transportation of goods to fleet personnel. The surfaces of these decks are coated with a special material that provides a rough and abrasive profile so that aircraft, equipment, and sailors do not slide when a ship is maneuvering in the open waters. This material, known as a "non-skid" or "non-slip" coating, is located on approximately 4,000,000 square feet of flight deck area within the U.S. Navy, with carriers alone possessing a combined surface area of over 2,000,000 square feet of non-skid coating.

The Navy's current non-skid coatings are composed of two components that are mixed together and applied over an anti-corrosive deck primer using a phenolic roller. The coating is applied to the deck by a roller to create a rough 'peak and valley' profile, thereby providing a frictional surface to prevent the sliding, moving, or skidding of crew members, aircraft, storage containers, and machinery. To provide this aggressive profile, these coatings usually contain aluminum oxide or aluminum metal aggregate for general areas (Type-G) or landing areas (Type-L), respectively. Non-skid coatings have been used by the Navy for decades, yet their long-term performance continues to remain a highly contentious issue.

Conventional non-skid coatings are typically composed of aromatic epoxy resins (e.g., Bisphenol A, Bisphenol F, or Novolac) and amino-functional resins (e.g., amidoamine resin), along with fillers, colorizing pigments, and aggregates that are mixed together to create a viscous formula. Due to their inherent chemistry, traditional non-skid coatings are not durable to the external environment of UV and visible radiation, which is evident by the rapid fading, chalking, and degradation that is routinely observed within a few months after application. Traditional non-skid coatings also contain relatively high levels of volatile organic compounds (VOCs), usually as solvent(s), which can lead to solvent entrapment, shrinkage, and cracking as the coating cures. These problems, amongst others, can contribute to performance failures of non-skid coatings during routine operations, as exemplified by the loss of abrasive profile, lifting of coating from the deck due to loss of adhesion, or large areas of corrosion seepage that result from cracks in the non-skid coating.

Siloxane-based materials, which contain silicone-oxygen bonds, are becoming increasingly popular within the global coatings market due to their outstanding external durability, chemical resistance, cleanability, increased thermal stability and low toxicity. Siloxane-based materials are also low in viscosity, thereby leading to reduced VOC requirements when formulated into coatings. Siloxanes can be engineered as linear or branched polysiloxane resins or cyclic structures (e.g., silsesquioxanes), and each can be functionalized with reactive organic groups.

Hybrid coating technology based on the incorporation of silicone-based resins (e.g., siloxanes or silanes) with epoxy or amine chemistries can provide better performance characteristics than traditional epoxy/amine coatings. For instance, silicone-oxygen bonds are much stronger than the carbon-carbon and carbon-hydrogen bonds that are typically found in traditional non-skid coatings. This increased bond strength leads to a greater external durability and chemical resistance, thereby extending the life-cycle of a coating by preventing the rapid chalking, fading and/or cracking that occurs due to degradation by ultra-violet (UV) and visible radiation. On the other hand, the organic portions of a hybrid coating are used to provide substrate binding and flexibility, thus leading to a coating that possesses direct-to-metal (DTM) adhesion and does not require a primer.

Silsesquioxanes are low in VOCs, provide good hardness and external durability, and can be functionalized with pendant reactive groups. Amino-functional silsesquioxane resins are commercially available and were used to formulate non-skid coatings as a replacement for the traditional amine resins (e.g., amidoamines) that often cause yellowing. As for the epoxy component, the traditional aromatic epoxies have been replaced with non-aromatic epoxy resins (e.g., zero VOC cycloaliphatic epoxies). These epoxy resins yield similar hardness and performance, yet provide better external durability due to their lack of aromatic character.

Thus, it is desirable to have a non-skid coating that has greater exterior durability than conventional coatings.

SUMMARY OF THE INVENTION

The non-skid coating described herein attempts to overcome the deficiencies of the conventional coatings with improved external durability and color retention, a reduced level of VOCs, and direct-to-metal (DTM) adhesion using organo-siloxane chemistry.

In one embodiment, a non-skid coating comprises a first component having an amino-functional siloxane resin; a second component having a non-aromatic epoxy resin; a spherical filler for lowering viscosity and reducing VOC content; a pigment; and a coarse aggregate. The coating can also include a catalyst, a thixotropic agent and a rheology agent. The amino-functional siloxane resin can be an amino-functional methyl phenyl polysiloxane, diphenyl polysiloxane, or silsesquioxane-based resin. The non-aromatic epoxy resin can be cycloaliphatic or aliphatic. The first component can be about 5% to 20% weight of the coating, and the second component can be about 80% to 95% weight of the coating.

In another embodiment, a method for producing a non-skid coating comprises mixing a first component having an amino-functional siloxane resin with a second component having a non-aromatic epoxy resin. The first component can also contain an amino-functional additive and a catalyst, while the second component can include a pigment, a spherical filler, a thixotropic agent and a rheology agent. The amino-functional siloxane resin can be an amino-functional methyl phenyl polysiloxane, diphenyl polysiloxane, or silsesquioxane-based resin. The non-aromatic epoxy resin can be cycloaliphatic or aliphatic. The first component is about 5% to 20% weight of the coating, and the second component is about 80% to 95% weight of the coating. The amino-functional additive can be a cycloaliphatic amine or amino-functional alkoxysilane, and can be present in 1% to 2% weight of the coating.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof.

It is to be understood that both the foregoing general description and the following detailed description are exemplary and explanatory and are intended to provide further explanation of the invention as claimed.

DETAILED DESCRIPTION

Reference will now be made in detail to the preferred embodiments of the present invention.

In an exemplary embodiment, a coating comprises a first component and a second component. Before application of the coating, the two components are mixed together in specified proportions.

The first component has an amino-functional siloxane resin. Examples of an amino-functional siloxane resin include an amino-functional methyl phenyl polysiloxane/silsesquioxane resin, also known as poly [(2-aminoethyl)aminopropyl]methoxy(dimethyl)siloxane, polymers with [(2-aminoethyl)aminopropyl]phenylsilsesquioxane, OH-term, which is commercially available as Silres HP 2000 by Wacker Silicones; aminopropylaminoethylpolysiloxane, commercially available as SF1708 from Momentive; and amino-functional diphenyl polysiloxane resins.

In one exemplary embodiment, the first component is comprised of 139.02 grams of amino-functional siloxane resin and 0.75 grams of dibutyl tin dilaurate (Aldrich) catalyst ("DBTDL"). In the exemplary embodiment, a non-skid coating (when the first component is combined with the second component) has about 5% to 20% by weight of the amino-functional siloxane resin. In another exemplary embodiment, a non-skid coating has about 9% to 14% by weight of the amino-functional siloxane resin.

The second component has a non-aromatic epoxy resin. In the exemplary embodiment, the non-aromatic epoxy resin is cycloaliphatic, but the non-aromatic epoxy resin could be aliphatic. An epoxy resin that is cycloaliphatic or aliphatic is more exterior durable than conventional epoxies that are aromatic. The epoxy resin does not degrade as readily when exposed to sunlight (UV and visible radiation) and an oxidative environment. Bisphenol compounds, which are aromatic, are hydrogenated to remove the aromatics and become cycloaliphatic. As a result, they do not undergo the same degradation process.

In one example, the epoxy resin can be cyclohexanol, 4,4-(1-methylethylidene)bis-, polymer with (chloromethyl)oxirane, manufactured by Hexion as Eponex 1510. In other examples, the epoxy resin can be diglycidyl ether of cyclohexane dimethanol, commercially available as Heloxy Modifier 107 by Hexion; diglycidyl ether of neopentyl glycol, commercially available as Heloxy Modifier 68 by Hexion; diglycidyl ether of 1,4-butanediol, commercially available as Heloxy Modifier 67 by Hexion; trimethylol propane triglycidyl ether, commercially available as Heloxy Modifier 48 by Hexion; polyglycidyl ether cyclosiloxane monomer, commercially available as CS-697 by Designer Molecules; and glycidyl ether POSS (polyhedral oligomeric silsesquioxane), commercially available as EPO409 by Hybrid Plastics. In an exemplary embodiment, a non-skid coating has about 5% to 20% by weight of the non-aromatic epoxy resin. In another exemplary embodiment, a non-skid coating has about 9% to 13% by weight of the non-aromatic epoxy resin.

The second component can also include other materials. For example, the second component includes a filler of ceramic microspheres, such as alkali alumino silicate ceramic, which is available as W-610 microspheres by 3M. These ceramic microspheres are used instead of conventional fillers, such as talc, mica, wollastonite or calcium carbonate, because the microspheres are spherical, rather than plate or rod-like. The spherical, ceramic microspheres reduce the viscosity and solvent requirements of the second component, as opposed to using the conventional fillers that would require additional solvent, thereby allowing the second component to be more easily assembled and the resulting non-skid coating both rollable and sprayable. The spherical filler is about 15% to 20% of the non-skid coating. It should be noted that reducing the VOC content in coatings is advantageous from an environmental standpoint.

The second component can also include an aluminum oxide mixture, which performs as a coarse aggregate to provide a coating with a frictional surface and hardness. Additionally, the second component can include one or more thixotropic agents, such as a micronized amide wax (i.e., CrayVallac PA4BA20), or a rheology agent, such as polyolefin fibers (i.e., polypropylene pulp). The polyolefin fibers also lower the gloss of the cured non-skid coating, thereby reducing the reflection of sunlight off the surface that would otherwise obstruct deck visibility when landing aircraft.

In one exemplary formula, the second component has 123.90 grams of an epoxy resin, available as Eponex 1510 by Hexion; 3.71 grams of titanium dioxide, available as Ti-Pure R-960 by DuPont; 8.67 grams of copper chromite black spinel pigment, available as V-7709 by Ferro Pigments; 182.50 grams of ceramic microspheres, available as W-610 by 3M; 37.50 grams of tert-butyl acetate, available from Aldrich; 50 grams of thixotropic agent, available as CrayVallac PA4BA20 by Cray Valley; 5 grams of polypropylene pulp, available as Short Stuff by Mini-Fibers, Inc.; 260 grams of 24 grit brown aluminum oxide, available from Kramer Industries; and 260 grams of 30 grit brown aluminum oxide, available from Industrial Supply, Inc.

An exemplary coating was assembled by mixing two components using a high speed mixer. The resulting product was a non-skid coating with about 91.5% solids (total solvent) or 95% solids (counting VOC exempt solvents). The coating was applied on various 0.25 inch thick blasted steels panels using a phenolic roller, then allowed to cure at ambient conditions for approximately seven days before being tested. Table 1, shown below, lists the materials of the first component and the second component as a percentage of the total non-skid formula.

TABLE 1

| First Component | Wt. % of Formula |
|---|---|
| Amino-functional siloxane resin | 13% |
| Dibutyl tin dilaurate (DBTDL) | 0.07% |
| Second Component | |
| Epoxy resin | 11.5% |
| Titanium dioxide | 0.34% |
| Copper chromite black spinel | 0.81% |
| Ceramic microspheres | 17% |
| tert-Butyl acetate | 3.5% |
| CrayVallac PA4BA20 | 4.6% |
| Polypropylene pulp | 0.46% |
| Aluminum oxide mix | 48.5% |

The resulting coating showed no cracking or delamination when impacted at twenty-five sites (each 0.75 inches apart to form a grid) with a four pound weight dropped from 40 inches above the sample, according to MIL-PRF-24667. The coefficient-of-friction (COF) of the coating on an 18"×18"×¼" panel, as measured by a Ball-on-Flat instrument, was 1.71 (avg.) at 19.4° C.

The volumetric mix ratios of the first component to the second component can be between 3:1 and 5:1. For ease of use in the industry, it may be preferable to have a ratio of 4:1. In the particular embodiment above, the ratio is 3.4:1 by volume. The following formulas include exemplary variations of a 4:1 ratio coating.

Examples of two components for exemplary non-skid coatings are provided below. The percentages of each material in the first and second components are merely exemplary and are not intended to be limited to those particular percentages or ratios.

In the exemplary formulas below, Silres HP 2000 is used as an amino-functional siloxane resin. In one example, 3-aminopropyltriethoxysilane (available from Gelest as SIA0610.0), which is an amino-functional silane, is used in combination with Silres HP 2000 to assist with desirable spray and/or roll viscosity and direct-to-metal adhesion. In another example, 1,3-cyclohexanebis(methylamine) (available from Aldrich), which is a cycloaliphatic amine, is used in combination with Silres HP 2000 to assist with desirable spray and/or roll viscosity and coating hardness.

Example 1

| First Component | Wt. % of Formula |
|---|---|
| DBTDL | 0.06% |
| Silres HP 2000 | 11.43% |
| Second Component | |
| Eponex 1510 | 10.20% |
| Titanium dioxide (R-960) | 0.49% |
| Shepherd Black 30C940 | 1.55% |
| Shepherd Blue 30C527 | 0.41% |
| 3M microspheres (W-610) | 17.47% |
| Butyl propionate | 3.49% |
| CrayVallac PA4BA20 | 6.17% |
| Polypropylene pulp | 0.61% |
| Aluminum oxide mix | 48.10% |

Example 2

| First Component | Wt. % of Formula |
|---|---|
| DBTDL | 0.06% |
| Silres HP 2000 | 10.07% |
| Gelest SIA0610.0 | 1.15% |
| Second Component | |
| Eponex 1510 | 11.19% |
| Titanium dioxide (R-960) | 0.51% |
| Shepherd Black 30C940 | 1.62% |
| Shepherd Blue 30C527 | 0.42% |
| 3M microspheres (W-610) | 18.26% |
| Butyl propionate | 3.22% |
| CrayVallac PA4BA20 | 5.69% |
| Polypropylene pulp | 0.52% |
| Aluminum oxide mix | 47.26% |

Example 3

| First Component | Wt. % of Formula |
|---|---|
| DBTDL | 0.06% |
| Silres HP 2000 | 10.86% |
| 1,3-cyclohexanebis(methylamine) | 0.39% |
| Second Component | |
| Eponex 1510 | 12% |
| Titanium dioxide (R-960) | 0.26% |
| Shepherd Black 30C940 | 0.84% |
| Shepherd Blue 30C527 | 0.22% |
| 3M microspheres (W-610) | 17.89% |
| Butyl propionate | 2.45% |
| CrayVallac PA4BA20 | 5.57% |
| Polypropylene pulp | 0.44% |
| Aluminum oxide mix | 49% |

As described herein, organo-siloxane technology has been used to create two-component (2K) non-skid coatings with improved external durability and color retention, while also providing direct-to-metal adhesion to flight decks in effort to eliminate the need for a deck primer. The coatings can also be either spray or roll-applied, unlike the traditional coatings. Due to the inclusion of silicone-based chemistry, the non-skid coatings contain reduced levels of VOCs and hence a higher solids content (e.g., about 91-95% solids for the hybrid siloxane non-skid coatings versus about 75-85% solids for traditional epoxy non-skid coatings). The inclusion of siloxanes can also aid with repelling hydrocarbons (e.g., oil or grease) that would otherwise seep into the non-skid coating and cause unsafe conditions.

Testing of the 4:1 mix ratio formulas (above) to U.S. Navy non-skid specifications (MIL-PRF-24667) revealed significant improvements in exterior durability and chemical resistance versus traditional epoxy non-skid coatings. For instance, 400 hours of QUV-B exposure showed no change in color for the herein siloxane-based non-skid coatings, whereas the traditional epoxy non-skids were significantly faded and degraded. In chemical resistance tests, such as 24 hour ethanol immersion and 28 day detergent immersion, the siloxane-based non-skid coatings remained in nearly pristine condition, whereas the traditional materials were softened and/or discolored.

In alternative embodiments, walnut shells, white aluminum oxide, garnet, aluminum metal, steel shot, or other aggregates can be used instead of aluminum oxide to provide a rough and hard profile. Low-solar-absorbing (LSA) pigments can be used to reduce the temperature of the decks and compartments beneath. These include Shepherd Black 30C940, Shepherd Blue 300527, Ferro Eclipse Black 10202, Ferro Eclipse Blue 10203, black iron oxide, copper phthalocyanine blue, and red iron oxide, amongst others. Examples of alternative thixotropic and rheology agents can be CrayVallac Extra (100% solids micronized amide wax) and amorphous silica, respectively, or others known to persons skilled in the art. Numerous solvents, such as tent-butyl acetate, butyl propionate, xylenes, Oxsol 100, PM Acetate or isoamyl acetate, can also be used in the non-skid/non-slip formulations The embodiments described above are intended to be exemplary. One skilled in the art recognizes that numerous alternative components and embodiments that may be substituted for the particular examples described herein and still fall within the scope of the invention.

What is claimed is:

1. A coating prepared by:
    mixing resins which consist of
    (a) an amino-functional siloxane resin, selected from (i) an amino-functional silsesquioxane-based resin and (ii) 3-[2-(aminoethyl)amino]propyl methyl dimethylpolysiloxane, and
    (b) a non-aromatic epoxy resin;
        wherein the amino-functional siloxane resin and the non-aromatic epoxy resin are the only resins in the coating; and
    forming a non-skid coating by applying the mixed components to a surface with a roller.

2. The coating of claim 1, wherein the amino-functional siloxane resin is the amino-functional silsesquioxane-based resin.

3. The coating of claim 2, wherein the amino-functional silsesquioxane-based resin is poly [(2-aminoethyl)aminopropyl]methoxy(dimethyl)siloxane, polymer with [(2-aminoethyl)aminopropyl]phenylsilsesquioxane, OH-terminal.

4. The coating of claim 1, wherein the non-aromatic epoxy resin is cyclohexanol, 4,4-(1-methylethylidene)bis-, polymer with (chloromethyl)oxirane, diglycidyl ether of cyclohexane dimethanol, diglycidyl ether of neopentyl glycol, diglycidyl ether of 1,4-butanediol, trimethylol propane triglycidyl ether, polyglycidyl ether cyclosiloxane monomer, or glycidyl ether polyhedral oligomeric silsesquioxane.

5. The coating of claim 1, wherein the coating further comprises a spherical filler, a pigment, a thixotropic agent, and an aggregate.

6. The coating of claim 1;
    wherein the mixed resins are applied to the surface with a phenolic roller; and
    wherein the coating has a peak and valley profile.

7. The coating of claim 1, wherein the coating comprises about 5% to about 20% amino-functional siloxane resin by weight.

8. The coating of claim 1, wherein the coating comprises about 5% to about 20% non-aromatic epoxy resin by weight.

9. The coating of claim 1, further comprising a catalyst.

10. The coating of claim 1, wherein the non-aromatic epoxy resin is aliphatic or cycloaliphatic.

11. The coating of claim 1, wherein the non-aromatic epoxy resin comprises cyclohexanol, 4,4-(1-methylethylidene)bis-, polymer with (chloromethyl)oxirane.

12. The coating of claim 1, wherein the non-aromatic epoxy resin comprises polyglycidyl ether cyclosiloxane monomer, having the structure

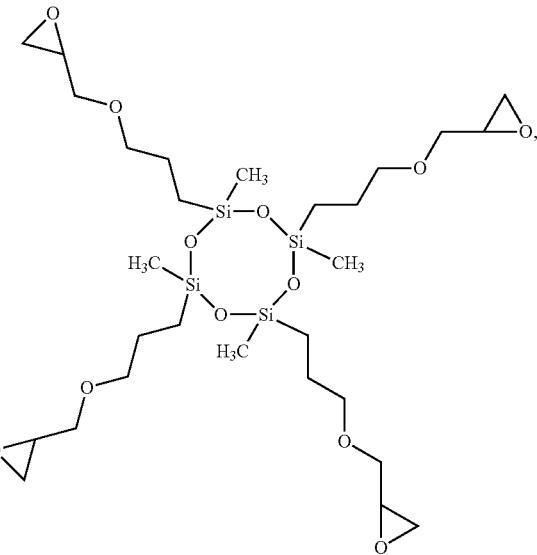

or glycidyl ether polyhedral oligomeric silsesquioxane, having the structure

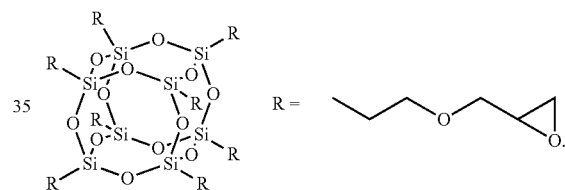

13. The coating of claim 1, wherein the coating comprises about 91% to about 95% solids by weight.

14. The coating of claim 1, wherein the coating comprises about 5% to about 20% by weight of the spherical filler.

* * * * *